US010334426B2

(12) United States Patent
Pitti

(10) Patent No.: US 10,334,426 B2
(45) Date of Patent: Jun. 25, 2019

(54) ONLINE/OFFLINE ATTRIBUTION SYSTEM FOR INTERNET OF THINGS PLATFORM AND A METHOD THEREOF

(71) Applicant: Abhishek Pitti, Attapur (IN)

(72) Inventor: Abhishek Pitti, Attapur (IN)

(*) Notice: Subject to any disclaimer, the term of this patent is extended or adjusted under 35 U.S.C. 154(b) by 0 days.

(21) Appl. No.: 16/162,797

(22) Filed: Oct. 17, 2018

(65) Prior Publication Data

US 2019/0116487 A1 Apr. 18, 2019

Related U.S. Application Data

(60) Provisional application No. 62/573,934, filed on Oct. 18, 2017.

(51) Int. Cl.
*H04W 8/26* (2009.01)
*H04W 8/18* (2009.01)
*H04L 29/08* (2006.01)
*G06Q 30/02* (2012.01)
*G06F 16/955* (2019.01)

(52) U.S. Cl.
CPC .......... *H04W 8/18* (2013.01); *G06F 16/9566* (2019.01); *G06Q 30/0201* (2013.01); *H04L 67/306* (2013.01); *H04W 8/26* (2013.01)

(58) Field of Classification Search
CPC .......... H04W 8/26; H04W 8/18; G06F 16/95; G06Q 30/0201
See application file for complete search history.

(56) References Cited

U.S. PATENT DOCUMENTS

| 2017/0359721 | A1* | 12/2017 | Ding | H04W 76/10 |
| 2018/0225717 | A1* | 8/2018 | Storti | G06Q 20/3272 |
| 2018/0366114 | A1* | 12/2018 | Anbazhagan | G10L 15/22 |

* cited by examiner

*Primary Examiner* — Kamran Afshar
*Assistant Examiner* — Farideh Madani
(74) *Attorney, Agent, or Firm* — Eldredge Law Firm; Richard Eldredge

(57) ABSTRACT

An online/offline attribution system for an internet-of-things platform. The online/offline attribution system includes a script module, pixel URL, consent database, sensor unit, a mapping module, and probabilistic device matching module. The script module is integrated with a digital platform to identify information about customers. The pixel URL is integrated with the script module to identify the MSISDN. The consent database stores consented MSISDN. The probabilistic device matching module determines the digital interactions of the customers across computing units. The sensor unit retrieves a unique identification number associated with the mobile device and transmits to the telecom server unit. The mapping module maps the retrieved unique identification number with stored consented MSISDN to generate and transmit a mapped consented MSISDN to backend server unit.

11 Claims, 2 Drawing Sheets

ONLINE/OFFLINE ATTRIBUTION SYSTEM FOR INTERNET OF THINGS PLATFORM AND A METHOD THEREOF

BACKGROUND

1. Field of the Invention

The present invention relates, in general, to an online/offline attribution system for an internet-of-things platform, and specifically relates to a system and method to identify and relate a plurality of physical interactions in a premises of an organization and digital interactions over a digital platform of the organization to track a journey of a customer across physical and digital platforms.

2. Description of Related Art

Background description includes information that may be useful in understanding the present invention. It is not an admission that any of the information provided herein is prior art or relevant to the presently claimed invention, or that any publication specifically or implicitly referenced is prior art.

Generally, computing devices include cookies to store the browsing activities of the customer as digital data. Such digital data of the customer is rich in information and have consequently attracted much attention in disciplines relating to the customer data analytics. Typically, the digital data of the customer indicates the preferences of the customer.

Various organizations such as retailers, marketing agencies, etc. track the sales by identifying the potential customer's journey on a specific digital platform. This approach restricts the analysis and forecasting of the sales if a specific customer visits different digital platforms before deciding to buy a specific product/service. Further, this approach does not use the customer's physical activities at the premises of the organizations which lead to inaccurate sales projections and forecasting.

To capture and store the physical interactions or activities of the customer in a premises (store location, showrooms, and shops), the organizations use computing units (POS) or sensor units. Due to the advent in the digital platforms, the captured physical interaction data is insufficient to determine the overall intentions and buying behavior of the customers. There are no systems and methods that exist to combine the digital activities and the physical activities of the customer, to provide for improved data capture.

Therefore, there is a need for a system and method for combining the physical and digital activities of the customer to estimate the sales and one or more interests/habits of the customer. Further, there is also a need for an online/offline attribution system and method for an internet-of-things platform.

Thus, in view of the above, there is a long-felt need in the industry to address the aforementioned deficiencies and inadequacies.

Further limitations and disadvantages of conventional and traditional approaches will become apparent to one of skill in the art through comparison of described systems with some aspects of the present disclosure, as set forth in the remainder of the present application and with reference to the drawings.

SUMMARY OF THE INVENTION

The system and method of the present invention provides for an online/offline attribution system and method for an internet-of-things platform.

An aspect of the present disclosure relates to an online/offline attribution system for an internet-of-things platform. The online/offline attribution system comprises a script module, pixel Uniform Resource Locator (URL), a consent database, a probabilistic device matching module, a telecom server unit, a sensor unit, a mapping module, and a backend server unit. The script module is integrated with a digital platform of an organization. The script module comprises a plurality executable instructions integrated into the digital platform of the organization to identify a plurality of information pertaining to one or more customers.

The plurality of information includes at least an identified information that is selected from at least one of: a frequency of accessing the digital platform, time of accessing the digital platform, type of one or more computing units used to access the digital platform, location of the computing unit, internet protocol (IP) address used to access the digital platform, and type of access networks.

The pixel Uniform Resource Locator (URL) is integrated with the script module to identify the mobile station international subscriber directory number (MSISDN). The computing unit is selected from at least one of a personal computer, a laptop, a personal digital assistant (PDA), and a mobile device.

The consent database is integrated with a telecom server unit to store a plurality of consented mobile station international subscriber directory numbers (MSISDN) corresponding to the customers. The consent database receives the identified mobile station international subscriber directory number (MSISDN) of the customer from the pixel URL.

The probabilistic device matching module is configured with a backend server unit to determine a plurality of digital interactions of the customers across the computing units based on the MSISDN identified by the pixel URL and transmits the determined digital interaction data to the backend server unit.

The sensor unit can be installed in premises of the organization to detect the presence of a mobile device of the customer in proximity and to retrieve a unique identification number associated with the mobile device by establishing a radio signal communication with the mobile device, or any other means. The sensor unit transmits the retrieved unique identification number to the telecom server unit.

The mapping module is integrated with the telecom server unit to map the retrieved unique identification number with the stored consented mobile station international subscriber directory number (MSISDN) to generate and transmit a mapped consented mobile station international subscriber directory number (MSISDN) to the backend server unit. The sensor unit determines a plurality of physical interactions of the customer in the premises based on the mapped consented mobile station international subscriber directory number (MSISDN) and transmitted the detected physical interactions data to the backend server unit.

In an aspect, the probabilistic device matching module utilizes a plurality of algorithms to identify if the digital platform is accessed from the plurality of computing units and access networks of the same customer.

In an aspect, the backend server unit stores the digital interactions data and the physical interactions data to generate a customized marketing data for the organization corresponding to each of the customers.

In an aspect, the executable instructions identify the mobile station international subscriber directory number (MSISDN) on detecting that the digital platform is accessed through the mobile device.

In an aspect, the digital platform comprises one or more digital assets and assigns a plurality of identification number to each of the digital assets to determine the digital asset accessed by the customer.

An aspect of the present disclosure relates to a method for identifying a physical interaction and a digital interaction of a customer. The method comprises a step of identifying a plurality of information about one or more customers through a script module integrated with a digital platform of an organization. The script module comprises a plurality of executable instructions integrated into the digital platform of the organization.

The method then includes the step of assigning a plurality of identification number to a plurality of digital assets to determine which digital asset is accessed by the customer through the digital platform. The digital platform comprises the digital assets. Further, the method includes the step of identifying the mobile station international subscriber directory number (MSISDN) by utilizing a pixel Uniform Resource Locator (URL) integrated with the script module. The method further includes a step of storing a plurality of consented mobile station international subscriber directory numbers (MSISDN) corresponding to the customers in a consent database integrated with a telecom server unit.

The method includes a step of receiving the identified mobile station international subscriber directory number (MSISDN) of the customer from the script module through the consent database. The method includes a step of determining a plurality of digital interactions of the customers across the computing units based on the MSISDN identified by the pixel URL through a probabilistic device matching module and transmitting the determined digital interaction data to a backend server unit. The method includes a step of detecting the presence of a mobile device of the customer in proximity and retrieving a unique identification number associated with the mobile device through a sensor unit installed in premises of the organization by establishing a radio signal communication with the mobile device.

Further, the method includes a step of transmitting the retrieved unique identification number to the telecom server unit. The method then includes a step of mapping the retrieved unique identification number with the stored consented mobile station international subscriber directory number (MSISDN) through a mapping module integrated with the telecom server unit. The method includes a step of generating and transmitting a mapped consented mobile station international subscriber directory number (MSISDN) to the backend server unit. The method includes a step of determining a plurality of physical interactions of the customer in the premises based on the mapped consented mobile station international subscriber directory number (MSISDN) through the sensor unit. The method then includes a step of transmitting the detected physical interactions data to the backend server unit. Furthermore, the method includes a step of storing the digital interactions data and the physical interactions data to generate customized marketing data for the organization corresponding to each of the customers through the backend server unit.

Accordingly, one advantage of the present invention is that it identifies and relates a plurality of physical interactions and digital interactions of the customer to provide an effective marketing return to the organization.

Another advantage of the present invention is that it optimizes the marketing spend and time of the organizations.

Another advantage of the present invention is that it increases sales by establishing a digital marketing capability.

Still another advantage of the present invention is that it identifies the marketing vehicles that may be effective to influence the user's shopping experience.

Another advantage of the present invention is that it enables the organization to acquire, develop and retain high-value customers more profitably and effectively by utilizing the customer data.

Another advantage of the present invention is that enables the organization to determine which items to be stocked and where to maximize profit.

Other features of embodiments of the present disclosure will be apparent from accompanying drawings and from the detailed description that follows.

Yet other objects and advantages of the present invention will become readily apparent to those skilled in the art following the detailed description, wherein the preferred embodiments of the invention are shown and described, simply by way of illustration of the best mode contemplated herein for carrying out the invention. As we realized, the invention is capable of other and different embodiments, and its several details are capable of modifications in various obvious respects, all without departing from the invention. Accordingly, the drawings and description thereof are to be regarded as illustrative in nature, and not as restrictive.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
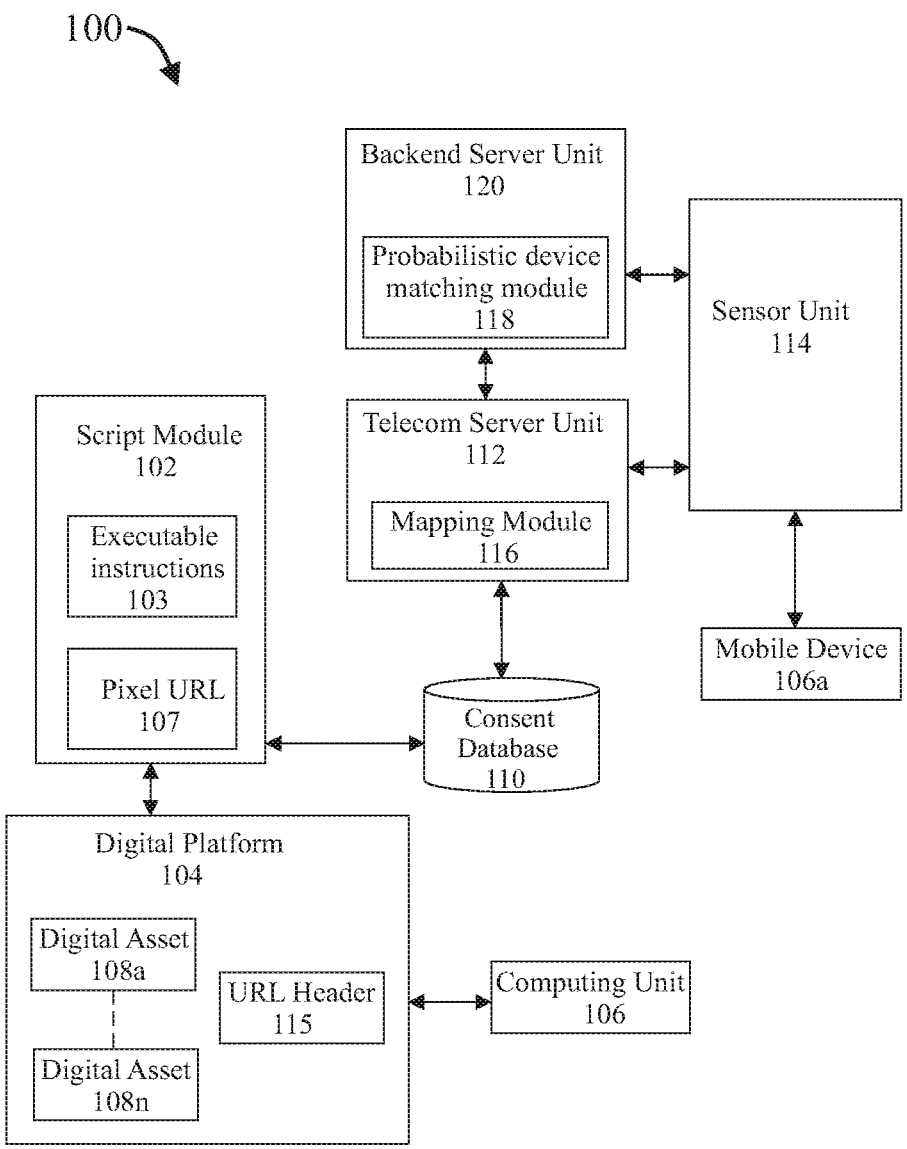
FIG. 1 is a block diagram of an online/offline attribution system for an internet-of-things platform in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques, and procedures either known to, or readily developed from known manners, means, techniques and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

FIG. 1 illustrates a block diagram 100 of the present online/offline attribution system for an internet-of-things platform, in accordance with an embodiment of the present invention. The online/offline attribution system comprises a script module 102, a pixel Uniform Resource Locator (URL) 107, a consent database 110, a probabilistic device matching module 118, a telecom server unit 112, a sensor unit 114, a mapping module 116, and a backend server unit 120.

In the preferred embodiment, the script module 102 is integrated with a digital platform 104 of an organization. The script module 102 comprises a plurality of executable instructions 103 integrated into the digital platform 104 of the organization to identify a plurality of information pertaining to one or more customers. The identified information is selected from at least one of a frequency of accessing the digital platform 104, time of accessing the digital platform 104, type of one or more computing units 106 used to access the digital platform 104, location of the computing unit 106, internet protocol (IP) address used to access the digital platform 106, and type of access networks.

The executable instructions 103 identify the mobile station international subscriber directory number (MSISDN) on detecting that the digital platform 104 is accessed through the mobile device 106a. The pixel Uniform Resource Locator (URL) 107 is integrated with the script module to identify the mobile station international subscriber directory number (MSISDN). The executable instructions 103 act as a software development kit (SDK) to allow the creation of the applications, package, framework, and platform for the present system. In an embodiment, the executable instructions 103 are pixel scripts.

The executable instructions 103 evokes the pixel URL 107. The pixel URL 107 provides a framework for discoverable and interoperable advanced communication services and functionality. Further, the pixel URL 107 is header enriched with the MSISDN provided by the telecom server unit 120. Furthermore, the pixel URL 107 accesses the MSISDN from the header. The pixel URL 107 pings the MSISDN in the consent database 110. If the MSISDN exists in the consent database 220, then only the pixel URL passes the MSISDN to the script module 102.

The digital platform 104 comprises one or more digital assets (108a, 108n), and assigns a plurality of identification number to each of the digital assets 108 to determine which digital asset is accessed by the customer. Examples of the computing unit 106 include but not limited to a personal computer, a laptop, a personal digital assistant (PDA), and a mobile device. The digital platform 104 includes but not limited to a web page, a software application, a social media platform, an advertisement banner, etc. Examples of the digital assets 108a, 108n are various sub-pages within the web page or various sub-options of the software applications. The plurality of identification numbers is unique pixels to identify the digital platform on which it was originally integrated.

The consent database 110 is integrated with a telecom server unit 112 to store a plurality of consented mobile station international subscriber directory numbers (MSISDN) corresponding to the customers. The consent database 110 receives the identified mobile station international subscriber directory number (MSISDN) of the customer from the script module 102. In an embodiment, the consent database 110 is realized through various technologies such as, but not limited to, Microsoft® SQL Server, Oracle®, IBM DB2®, Microsoft Access®, PostgreSQL®, MySQL® and SQLite®, and the like.

The probabilistic device matching module 118 is configured with a backend server unit 120 to determine a plurality of digital interactions of the customers across the computing units 106 based on the MSISDN identified by the pixel URL 107 and transmits the determined digital interaction data to the backend server unit 120. The probabilistic device matching module 118 utilizes a plurality of algorithms to identify if the digital platform is accessed from the similar computing units 106 and similar access networks.

In an embodiment, the probabilistic device matching module 118 utilizes a likelihood ratio method to assign comparison outcomes to the correct, or more likely decision. The likelihood ratio method leverages a statistical theory and data analysis and, thus, can establish more accurate links between various digital data of the customer. The present the probabilistic device matching module 118 assigns a percentage value to indicate the probability of a match. The size of digital data is huge which may lead to potential duplicates, human error, and discrepancies. Hence the present probabilistic device matching module 118 is designed to determine links between identified digital data effectively. The present probabilistic device matching module 118 may utilize various machine learning algorithms to accurately evaluate the customer's browsing patterns without sacrificing the browsing speed.

The sensor unit 114 is installed in premises of the organization to detect the presence of a mobile device 106a of the customer in proximity and to retrieve a unique identification number associated with the mobile device 106a by establishing a radio signal communication with the mobile device 106a, or any other means of communication. The sensor unit 114 transmits the retrieved unique identification number to the telecom server unit 112. In an embodiment, the present sensor unit 114 is modified "femtocell." The premise is a physical location of the organization that includes but not limited to a shop, a showroom, a store, a mall, etc.

In an embodiment, the sensor unit 114 utilizes a communication module to transmit the retrieved unique identification number and a sensor identification number to the telecom server unit 112 over a communication network. The communication network includes, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the sensor unit 114 determines a plurality of physical interactions of the customer in the premises based on the consented mobile station international subscriber directory number (MSISDN) and transmits the detected physical interactions data to the backend server unit 120 after checking the consent. The communication module establishes a secure communication network to establish a communication between the sensor unit 114, the telecom server unit 112 and the backend server unit 120. The sensor unit 114 uses AES 256 bits of encryption technique to secure the communication. The data to be transmitted is ciphered using 256 bits secret cryptographic key which is deciphered at the telecom server unit 112 and the backend server unit 120 using the same secret key.

The mapping module 116 is integrated with the telecom server unit 112 to map the retrieved unique identification number with the stored consented mobile station international subscriber directory number (MSISDN) to generate and transmit a mapped consented mobile station international subscriber directory number (MSISDN) to the backend server unit 120. The backend server unit 120 stores the digital interactions data and the physical interactions data to generate a customized marketing data for the organization corresponding to each of the customers.

In an embodiment, the backend server unit 120 executes procedures such as, but not limited to, programs, routines, or scripts stored in one or more memories for supporting the hosted application or the software service. In an embodiment, the hosted application or the software service is configured to perform one or more predetermined operations. Examples of the backend server unit 120 include but not limited to a Java application server, a .NET framework application server, a Base4 application server, a PHP framework application server, or any other application server framework.

The combination of the data processed by the probabilistic device matching module 118 and the retrieved MSISDN by the pixel URL 107 provides accurate results to identify the digital journey of the customers across all the computing units 106 operated by the customers. In operation, the MSISDN received at the digital platform is mapped with the MSISDN received at the physical location through the sensor unit 114 to provide end to end the journey of the customer and in return provides an effective marketing return to the organization.

Figure 2:
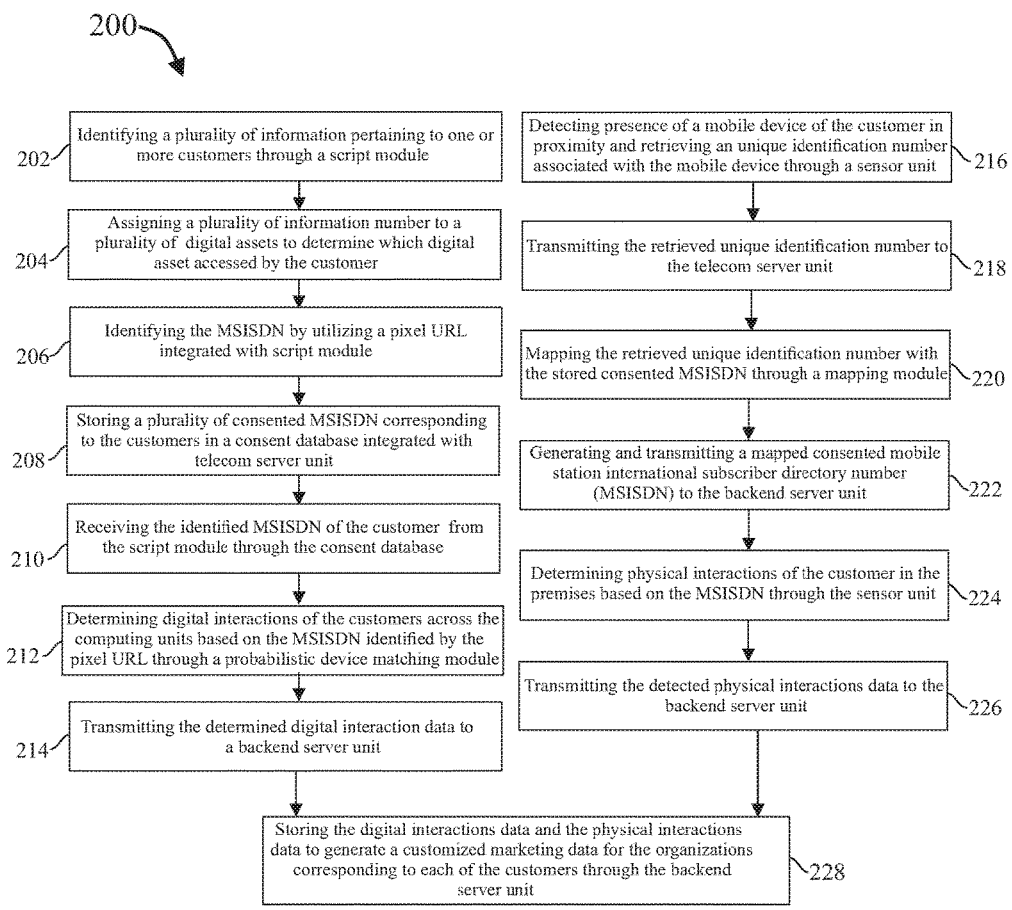
FIG. 2 is a flowchart of a method for identifying a physical interaction and a digital interaction of a customer in accordance with the system of FIG. 1.

FIG. 2 illustrates a flowchart 200 of the method for identifying a physical interaction and a digital interaction of a customer, in accordance with an embodiment of the present invention. The method comprises a step 202 of identifying a plurality of information about one or more customers through a script module integrated with a digital platform of an organization. The script module comprises a plurality executable instructions integrated into the digital platform of the organization. The identified information is selected from at least one of a frequency of accessing the digital platform, time of accessing the digital platform, type of one or more computing units used to access the digital platform, location of the computing unit, internet protocol (IP) address used to access the digital platform, type of access networks, and mobile station international subscriber directory number (MSISDN).

The method then includes the step 204 of assigning a plurality of identification number to a plurality of digital assets to determine which digital asset is accessed by the customer through the digital platform. The digital platform comprises the digital assets. Further, the method includes the step 206 of identifying the mobile station international subscriber directory number (MSISDN) by utilizing a pixel Uniform Resource Locator (URL) integrated with the script module. The method further includes a step 208 of storing a plurality of consented mobile station international subscriber directory numbers (MSISDN) corresponding to the customers in a consent database integrated with a telecom server unit.

The method includes a step 210 of receiving the identified mobile station international subscriber directory number (MSISDN) of the customer from the script module through the consent database. The method includes a step 212 of determining a plurality of digital interactions of the customers across the computing units based on the MSISDN identified by the pixel URL through a probabilistic device matching module. Then the method includes a step 214 of transmitting the determined digital interaction data to a backend server unit.

The method includes a step 216 of detecting the presence of a mobile device of the customer in proximity and retrieving a unique identification number associated with the mobile device through a sensor unit installed in premises of the organization by establishing a radio signal communication with the mobile device. Further, the method includes a step 218 of transmitting the retrieved unique identification number to the telecom server unit. The method then includes a step 220 of mapping the retrieved unique identification number with the stored consented mobile station international subscriber directory number (MSISDN) through a mapping module integrated with the telecom server unit. The method includes a step 222 of generating and transmitting a mapped consented mobile station international subscriber directory number (MSISDN) to the backend server unit. The method includes a step 224 of determining a plurality of physical interactions of the customer in the premises based on the mapped consented mobile station international subscriber directory number (MSISDN) through the sensor unit. The method then includes a step 226 of transmitting the detected physical interactions data to the backend server unit. Finally, the method includes a step 228 of storing the digital interactions data and the physical interactions data to generate a customized marketing data for the organization corresponding to each of the customers through the backend server unit.

Thus the present system and method enable an organization (retailers, businesses, and electronic commerce websites) to optimize the effectiveness of marketing return by tracking the customer's journey across digital and physical channels by utilizing a combination of header enrichment mechanism and probabilistic device matching module. Further, the present invention accurately identifies the customer in the digital world and the physical world so that the organizations can manage their marketing resources effectively. Additionally, the present invention not only helps the retailers but can also be utilized in the organization operating in the consumer goods domain, banking, insurance, telecom, media, and healthcare to enhance their sales.

No language in the specification should be construed as indicating any non-claimed element as essential to the practice of the invention.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An online/offline attribution system for an internet-of-things platform, the online/offline attribution system comprises:
    a script module integrated with a digital platform of an organization, wherein the script module includes:
        a plurality executable instructions integrated into the digital platform of the organization to identify a plurality of information pertaining to a customer;
    a pixel Uniform Resource Locator (URL) integrated with the script module to identify a mobile station international subscriber directory number (MSISDN) of one or more computing units;
    a consent database integrated with a telecom server unit to store a plurality of consented mobile station international subscriber directory numbers (MSISDN) corresponding to the customer, wherein the consent database receives the identified mobile station international subscriber directory number (MSISDN) of the customer from the pixel URL;
    a probabilistic device matching module configured with a backend server unit to determine a plurality of digital interactions of the customer across the one or more computing units based on the MSISDN identified by the pixel URL and transmits the determined digital interaction data to the backend server unit;
    a sensor unit installed in a premises of the organization to detect presence of a mobile device of the customer in proximity and to retrieve a unique identification number associated with the mobile device by establishing a wireless communication with the mobile device, wherein the sensor unit transmits the retrieved unique identification number to a telecom server unit;
    a mapping module integrated with the telecom server unit to map the retrieved unique identification number with the stored consented mobile station international subscriber directory number (MSISDN) to generate and transmit a mapped consented mobile station international subscriber directory number (MSISDN) to the backend server unit, wherein the sensor unit determines a plurality of physical interactions of the customer in the premises based on the mapped consented mobile station international subscriber directory number (MSISDN) and transmitted the detected physical interactions data to the backend server unit.

2. The system according to claim 1, wherein the probabilistic device matching module utilizes a plurality of algorithms to identify if the digital platform is accessed from the one or more computing units and access networks of the customer.

3. The system according to claim 1, wherein the backend server unit stores the digital interactions data and the physical interactions data to generate a customized marketing data for the organization corresponding to the customer.

4. The system according to claim 1, wherein the executable instructions identifies the mobile station international subscriber directory number (MSISDN) on detecting that the digital platform is accessed through the mobile device.

5. The system according to claim 1, wherein the digital platform comprises one or more digital assets, and assigns an identification number to each of the digital assets to determine the digital asset accessed by the customer.

6. The system according claim 1, wherein plurality of information pertaining to one or more customers comprises at least one of:
    a frequency of accessing the digital platform;
    a time of accessing the digital platform;
    a type of the one or more computing units used to access the digital platform;
    a location of the computing unit, internet protocol (IP) address used to access the digital platform; and
    a type of access networks.

7. A method for identifying a digital interaction and a physical interaction of a customer, the method comprising steps of:
    identifying a plurality of information pertaining to a customer through a script module integrated with a digital platform of an organization, wherein the script module comprises a plurality of executable instructions integrated into the digital platform of the organization;
    assigning a plurality of identification number to a plurality of digital assets to determine the digital asset accessed by the customer through the digital platform, wherein the digital platform comprises the digital assets;
    identifying a mobile station international subscriber directory number (MSISDN) by utilizing a pixel Uniform Resource Locator (URL) integrated with the script module;
    storing a plurality of consented mobile station international subscriber directory numbers (MSISDN) corresponding to the customer in a consent database integrated with a telecom server unit;
    receiving the identified mobile station international subscriber directory number (MSISDN) of the customer from the script module through the consent database;
    determining a plurality of digital interactions of the customers across the one or more computing units based on the MSISDN identified by the pixel URL through a probabilistic device matching module, and transmitting the determined digital interaction data to a backend server unit;
    detecting presence of a mobile device of the customer in proximity and retrieving a unique identification number associated with the mobile device through a sensor unit installed in premises of the organization by establishing a wireless communication with the mobile device;

transmitting the retrieved unique identification number to the telecom server unit;

mapping the retrieved unique identification number with the stored consented mobile station international subscriber directory number (MSISDN) through a mapping module integrated with the telecom server unit;

generating and transmitting a mapped consented mobile station international subscriber directory number (MSISDN) to the backend server unit;

determining a plurality of physical interactions of the customer in the premises based on the mapped consented mobile station international subscriber directory number (MSISDN) through the sensor unit; and transmitting the detected physical interactions data to the backend server unit.

8. The method according to claim 7, wherein the probabilistic device matching module utilizes a plurality of algorithms to identify if the digital platform is accessed from the one or more computing units and access networks of the same customer.

9. The method according to claim 7, wherein the backend server unit stores the digital interactions data and the physical interactions data to generate a customized marketing data for the organization corresponding to each of the customers.

10. The method according to claim 7, wherein the executable instructions identifies the mobile station international subscriber directory number (MSISDN) on detecting that the digital platform is accessed through the mobile device.

11. The method according to claim 7, wherein the identified information is selected from at least one of: a frequency of accessing the digital platform, time of accessing the digital platform, type of one or more computing units used to access the digital platform, location of the one or more computing units, internet protocol (IP) address used to access the digital platform, type of access networks, and mobile station international subscriber directory number (MSISDN).

* * * * *